(12) United States Patent
Ebata et al.

(10) Patent No.: US 8,763,494 B2
(45) Date of Patent: Jul. 1, 2014

(54) TORQUE FLUCTUATION ABSORBER

(71) Applicant: Aisin Seiki Kabushiki Kaisha, Aichi-ken (JP)

(72) Inventors: Masaru Ebata, Chita (JP); Yasunori Doman, Hirakata (JP); Takashi Hori, Anjo (JP); Toshiya Yamashita, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/626,284

(22) Filed: Sep. 25, 2012

(65) Prior Publication Data

US 2013/0081511 A1 Apr. 4, 2013

(30) Foreign Application Priority Data

Sep. 29, 2011 (JP) ................................. 2011-214266

(51) Int. Cl.
*F16F 15/12* (2006.01)
(52) U.S. Cl.
USPC ........................................................ 74/574.4
(58) Field of Classification Search
USPC ................. 74/572.2, 574.4; 464/45, 46, 68.1; 192/55.1, 55.2, 56.6, 212
See application file for complete search history.

(56) References Cited

U.S. PATENT DOCUMENTS

| 5,009,301 | A | * | 4/1991 | Spitler ...................... 192/213.3 |
| 6,142,272 | A | * | 11/2000 | Meisner et al. .............. 192/3.29 |
| 6,571,929 | B2 | * | 6/2003 | Tomiyama et al. ........ 192/213.1 |
| 7,226,384 | B2 | * | 6/2007 | Tryon et al. ....................... 477/5 |
| 2009/0133978 | A1 | * | 5/2009 | Degler et al. ................ 192/3.29 |
| 2011/0192691 | A1 | | 8/2011 | Murata et al. |

FOREIGN PATENT DOCUMENTS

JP 2010-091100 A 4/2010
JP 2010-255753 A 11/2010

* cited by examiner

*Primary Examiner* — Vicky Johnson
(74) *Attorney, Agent, or Firm* — Buchanan Ingersoll & Rooney P.C.

(57) ABSTRACT

A torque fluctuation absorber includes a drive plate configured to rotate integrally with a crankshaft of an internal combustion engine, a center plate, a side plate, an elastic member for absorbing torque fluctuations, and a block member configured to be engaged with the drive plate and attached to the side plate, wherein the side plate includes plural accommodation portions accommodating the elastic member, and at least one of a recessed portion and a first window portion which are provided at a position corresponding to a position of the block member, and the block member is attached to a portion of the side plate between adjacent accommodation portions in a circumferential direction of the side plate.

13 Claims, 6 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2011-214266, filed on Sep. 29, 2011, the entire content of which is incorporated herein by reference.

TECHNICAL FIELD

This disclosure relates to a torque fluctuation absorber.

BACKGROUND DISCUSSION

A torque fluctuation absorber is arranged on a power transmission path between an engine and a transmission, and absorbs (restricts) fluctuating torque generated between the engine and the transmission. The torque fluctuation absorber may include a damper portion for absorbing the fluctuating torque by means of an elastic force (a spring force). The damper portion includes a coil spring arranged between the rotating members in a circumferential direction thereof so that the coil spring absorbs the fluctuating torque by being compressed in a case where the two rotating members rotate relative to each other.

A device provided with the aforementioned damper portion is disclosed in JP2010-255753A (hereinafter referred to as Patent reference 1). The device disclosed in Patent reference 1 includes a first rotating member connected to a crankshaft, a second rotating member connected to a torque converter, an outer side damper supporting member connected to the first rotating member, an inner side damper supporting member connected to the second rotating member and a coil spring arranged between the outer side damper supporting member and the inner side damper supporting member. According to the device disclosed in Patent reference 1, the outer side damper supporting member is connected the first rotating member via a block member and a bolt which are arranged radially outwardly relative to the coil spring.

Another device is disclosed in JP2010-91100A (hereinafter referred to as Patent reference 2). The device disclosed in Patent reference 2 includes a spring holding member connected to a crankshaft, a spring side member connected to a torque converter and a damper spring arranged between the spring holding member and the spring side member. According to the device disclosed in Patent reference 2, the spring side member is connected to the torque converter via a set block and a fastening bolt each of which is arranged at a position offset from the damper spring in a circumferential direction.

According to the damper portion of Patent reference 1, however, the coil spring is arranged radially inwardly relative to the block member, and therefore a torsional angle of the damper portion may be small. Thus, flexibility in or a degree of freedom of improvement in performance, which is attained by setting a torsional rigidity at low, may be decreased.

According to the damper portion of Patent reference 2, the spring holding member arranged at an engine side relative to the damper spring on the power transmission path has a small inertia, and thus a resonance frequency is high. Accordingly, attenuation performance may not be sufficiently ensured.

A need thus exists for a torque fluctuation absorber which is not susceptible to the drawback mentioned above.

SUMMARY

According to an aspect of this disclosure, a torque fluctuation absorber includes a drive plate configured to rotate integrally with a crankshaft of an internal combustion engine, a center plate arranged coaxially with and rotatable relative to the drive plate, a side plate arranged coaxially with and rotatably relative to the center plate, an elastic member for absorbing torque fluctuations generated between the side plate and the center plate, and a block member configured to be engaged with the drive plate by means of an engaging member and attached to the side plate, wherein the side plate includes plural accommodation portions accommodating the elastic member, and at least one of a recessed portion and a first window portion which are provided at a position corresponding to a position of the block member and the block member is attached to a portion of the side plate between adjacent accommodation portions in a circumferential direction of the side plate.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
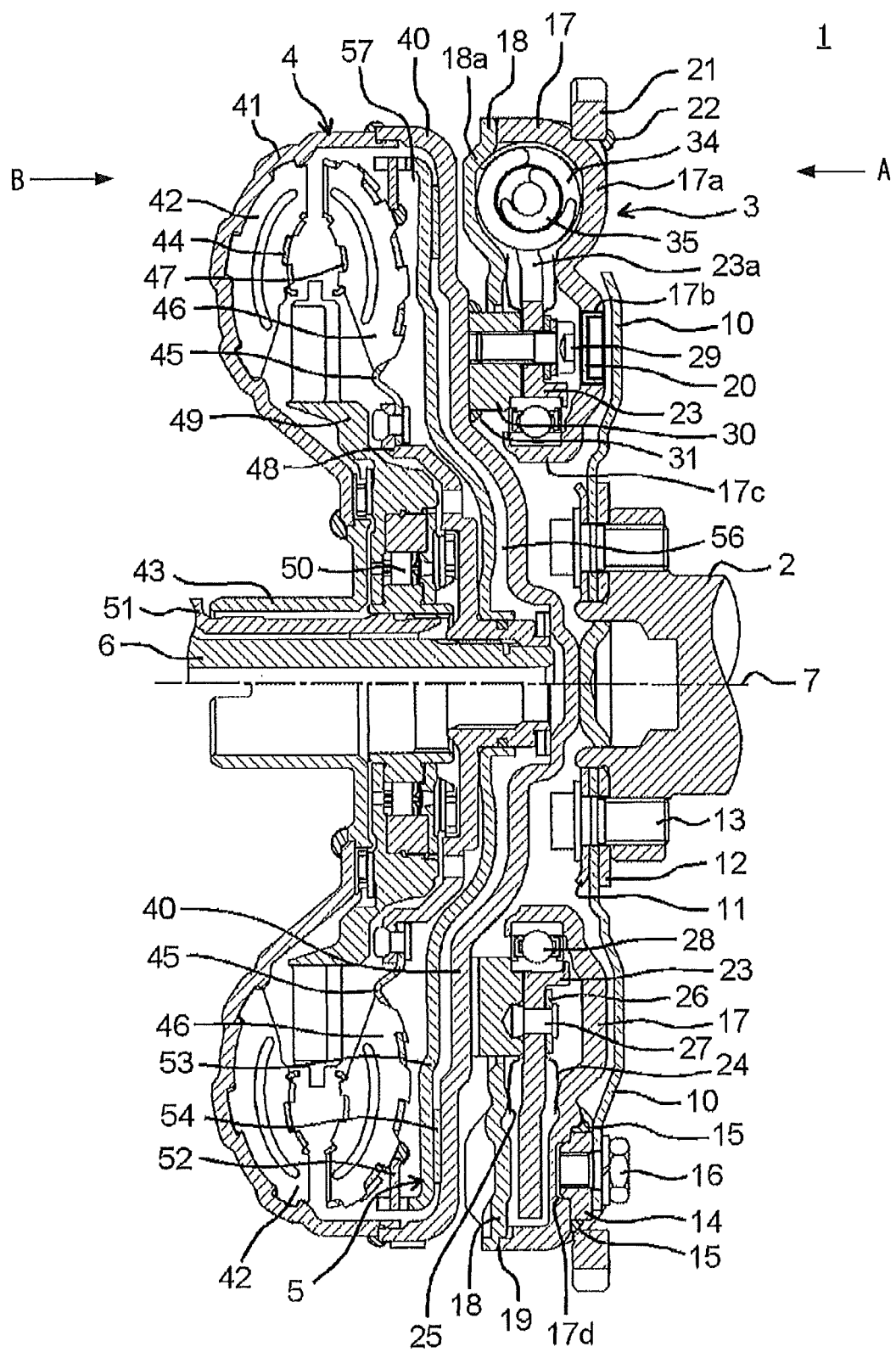
FIG. 1 is a cross-sectional view taken along line I-I in FIGS. 2 and 3, which schematically illustrates a power transmission device including a torque fluctuation absorber according to a first embodiment disclosed here.

A torque fluctuation absorber 3 according to a first embodiment, includes a drive plate 10 (refer to FIG. 1) configured to rotate integrally with a crankshaft 2 (refer to FIG. 1) of an engine serving as an internal combustion engine, a center plate 23 (refer to FIG. 1) arranged coaxially with and rotatable relative to the drive plate 10, a side plate 17, 18 (refer to FIG. 1) arranged rotatable relative to and coaxially with the center plate 23, an outer coil spring 34 and an inner coil spring 35 each serving as an elastic member (refer to FIG. 1) for absorbing torque fluctuations generated between the side plate 17, 18 and the center plate 23, and a block member 14 (refer to FIG. 1) which is configured to engage with the drive plate 10 by means of a bolt 16 serving as an engaging member and which is attached to the side plate 17, wherein the side plate 17, 18 includes plural accommodation portions 17a, 18a (refer to FIG. 1) each accommodating the outer coil spring 34 and the inner coil spring 35 and includes at least one of a recessed portion 17d and a first window portion 17e at a position corresponding to a position of the block member 14, the block member 14 is attached to a portion of the side plate 17 between adjacent accommodation portions 17a, 17a (refer to FIG. 1) in a circumferential direction of the side plate 17.

In the embodiments disclosed here, reference numerals are for enhancing understanding and are not provided to intend to limit the embodiments to those illustrated in the drawings.

The torque fluctuation absorber 3 according to the first embodiment will be explained with reference to the drawings. As illustrated in FIG. 1, a power transmission device 1 is a device for transmitting rotative power of the engine (serving as the internal combustion engine) to a transmission. At the power transmission device 1, the torque fluctuation absorber 3 and a torque converter 4 are arranged serially with each other on a power transmission path between a crankshaft 2 of the engine and an input shaft 6 of the transmission. The crankshaft 2 and the input shaft 6 are arranged coaxially with each other on a rotational axis 7.

The torque fluctuation absorber 3 absorbs (restricts) fluctuating torque generated between the engine and the transmission (refer to FIGS. 1 to 4). The torque fluctuation absorber 3 is arranged on a power transmission path between the crankshaft 2 and the torque converter 4 (a front cover 40). The torque fluctuation absorber 3 includes a damper portion absorbing the fluctuation torque by means of an elastic force (a spring force). The torque fluctuation absorber 3 includes, as component members, the drive plate 10, side members 11, 12, a bolt 13, the block member 14, a welded portion 15, a bolt 16, the side plate 17, the side plate 18, a welded portion 19, a cap 20, a ring gear 21, a welded portion 22, the center plate 23, cover members 24, 25, a side member 26, a rivet 27, a bearing 28, a bolt 29, a block member 30, a welded portion 31, seat members 32, 33, the outer coil spring 34 and the inner coil springs 35, 36.

Figure 4:
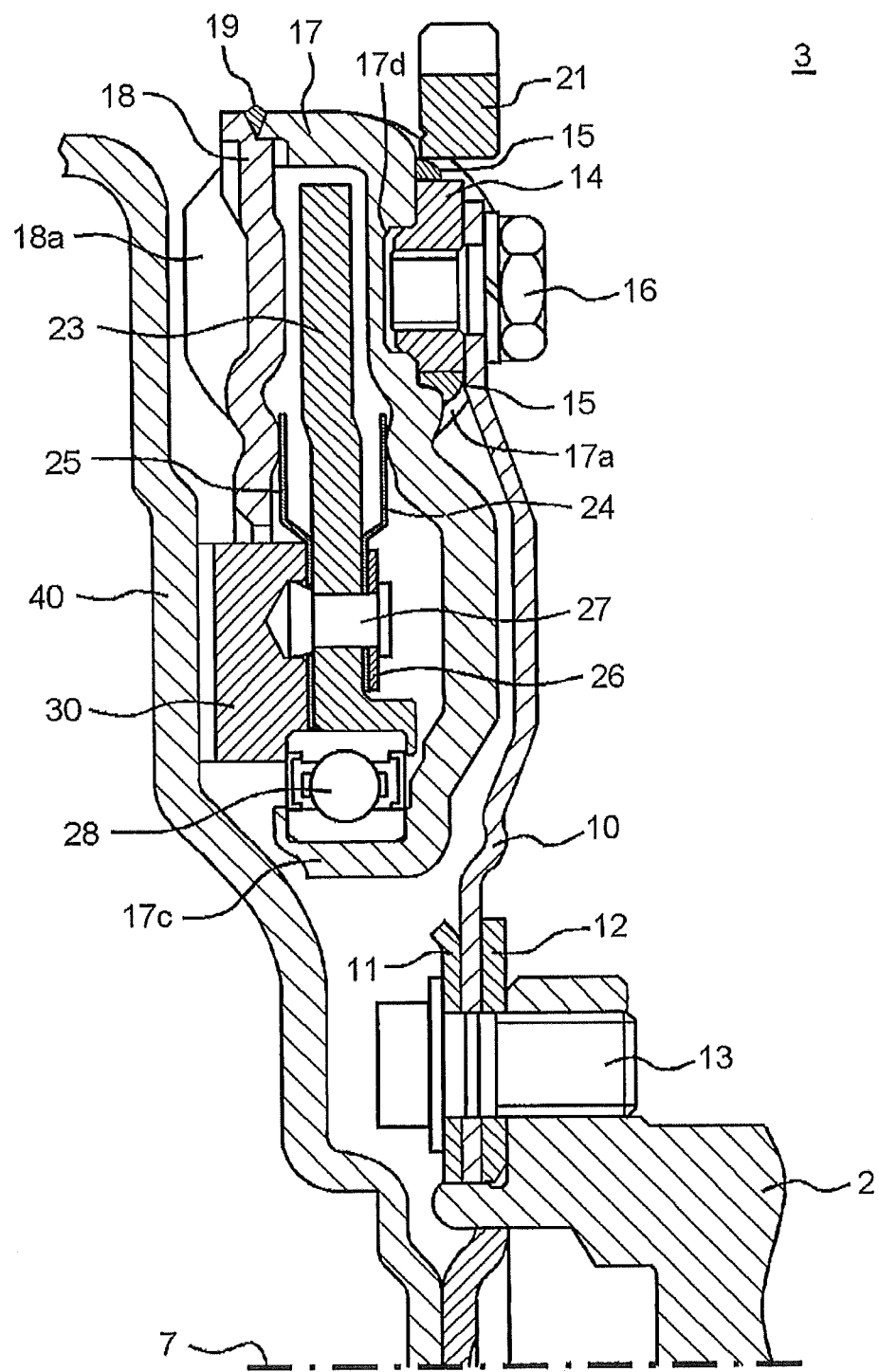
FIG. 4 is a partial enlarged cross-sectional view schematically illustrating the torque fluctuation absorber according to the first embodiment.

The drive plate 10 is a disc-shaped plate for inputting the rotative power from the crankshaft 2 to the torque fluctuation absorber 3 (refer to FIGS. 1 and 4). The drive plate 10 is fastened (connected) to the crankshaft 2 by means of the bolt 13 at plural positions in a state where the drive plate 10 is sandwiched by the side member 11 and the side member 12 at a radially inward portion of the drive plate 10. Accordingly, the drive plate 10 rotates integrally with the crankshaft 2. The drive plate 10 is fastened by means of the bolt 16 at plural positions to the corresponding block member 14 at a radially outward portion of the drive plate 10.

The side member 11 is an annular plate member for stabilizing a bearing surface of a bolt head of the bolt 13 and for enhancing durability of the drive plate 10 (refer to FIGS. 1 and 4). The side member 11 is arranged between the bolt head of the bolt 13 and the drive plate 10, and is fastened (connected) to the crankshaft 2 together with the drive plate 10 and the side member 12 by means of the bolt 13 at plural positions.

The side member 12 is an annular plate member for enhancing durability of the drive plate 10 against, for example, vibrations (refer to FIGS. 1 and 4). The side member 12 is arranged between the drive plate 10 and the crankshaft 2, and is fastened (connected) to the crankshaft 2 together with the drive plate 10 and the side member 11 by means of the bolt 13 at plural positions.

The bolt 13 is a member fastening (connecting) the drive plate 10 and the side members 11, 12 to the crankshaft 2 (refer to FIGS. 1 and 4).

Figure 2:
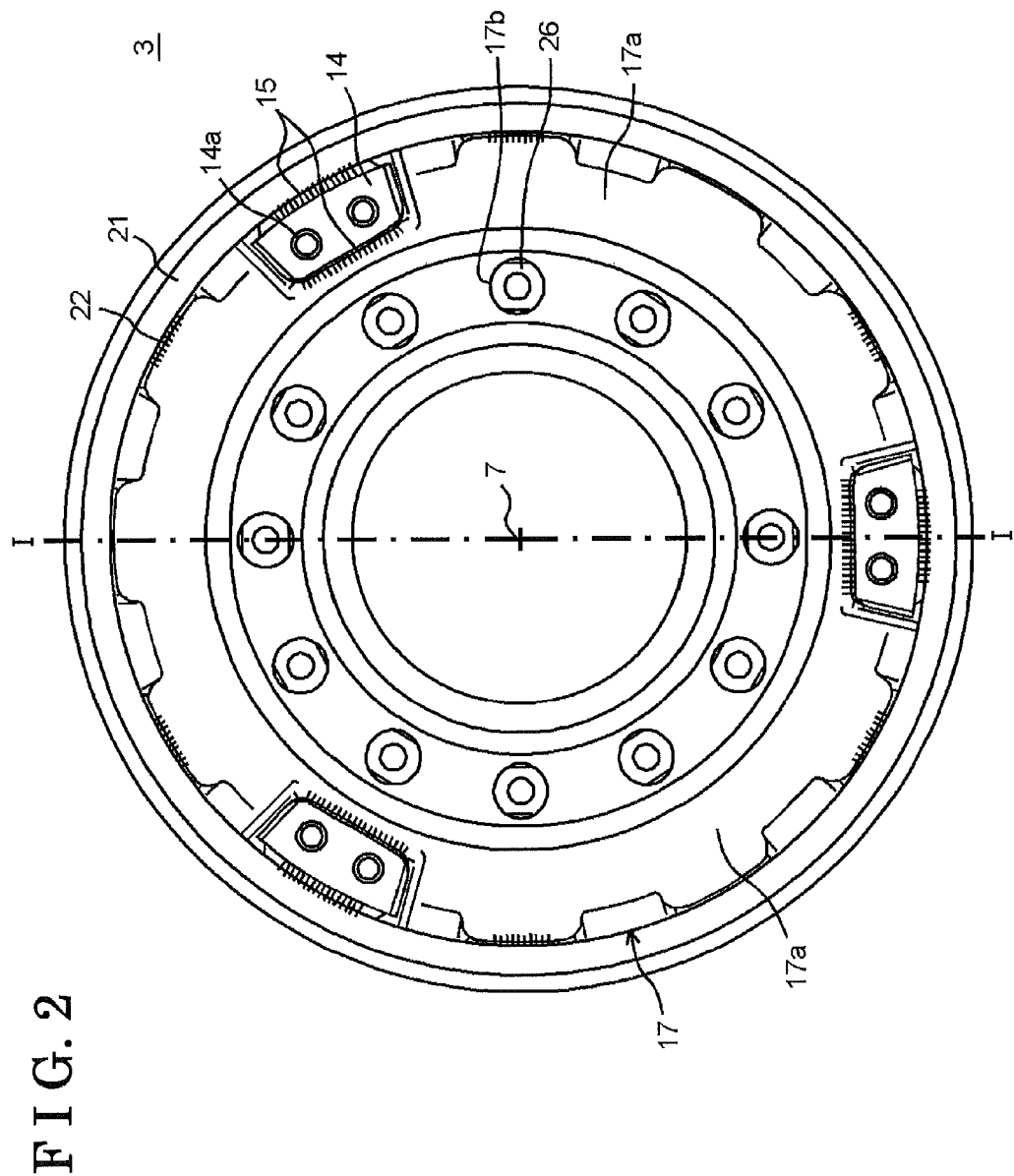
FIG. 2 is a plan view seen from a direction of an arrow A in FIG. 1, which schematically illustrates the torque fluctuation absorber according to the first embodiment.

The block member 14 is a block-shaped member to which the drive plate 10 is fastened by means of the bolt 16 (refer to FIGS. 1, 2 and 4). The block member 14 is attached to a recessed portion 17d formed at the side plate 17, at a portion between an accommodation portion 17a (that is, a portion in which the coil springs 34, 35, 36 are accommodated) and another accommodation portion 17a positioned next or adjacent thereto in a circumferential direction of the side plate 17. In other words, the block member 14 is arranged at a position that overlaps with a position of the accommodation portion 17a in the circumferential direction. The block member 14 is, at radially outward and inward portions thereof, fixedly welded to the side plate 17 at the welded portions 15, 15, respectively. The block member 14 includes a female threaded portion 14a which is provided at a portion corresponding to the bolt 16 and into which the bolt 16 is screwed. The drive plate 10 is fastened (connected) to the block member 14 by means of the bolt 16, and thus the block member 14 rotates integrally with the drive plate 10 and the side plate 17.

The welded portion 15 is a portion at which the block member 14 is fixed to the side plate 17 by means of welding (refer to FIGS. 1, 2 and 4). At the welded portions 15, 15, the radially outward portion and a radially inward portion of the block member 14 are fixed to the side plate 17.

The bolt 16 is a member fastening (connecting) the drive plate 10 to the block member 14 (refer to FIGS. 1 and 4).

The side plate 17 is an annular member (refer to FIGS. 1 to 4). The side plate 17 is arranged at an outer periphery of the center plate 23 and/or at an engine side relative to the center plate 23. The side plate 17 includes, at a radially inward portion thereof, a cylindrical portion 17c projecting in a direction of the front cover 40. An inner ring of the bearing 28 is attached (press-fitted, fixed in a caulked manner) at an outer peripheral surface of the cylindrical portion 17c and the side plate 17 rotatably supports the center plate 23 via the bearing 28. The side plate 17 includes a hole portion 17b for receiving therethrough the bolt 29. The cap 20 closing an entire hole portion 17b is mounted on the hole portion 17b. The side plate 17 includes a drawn portion provided at a portion between the hole portion 17b and the accommodation portion 17a in a radial direction of the side plate 17 which projects in a direction of the center plate 23 along an entire circumference of the side plate 17. The side plate 17 is, at the drawn portion thereof, in slidably pressure contact with the cover member 24 along the entire circumference. At a clearance between the side plate 17 and the center plate 23, the portion in which the coil springs 34, 35, 36 are accommodated is covered with the cover member 24. The side plate 17, at the radially outward portion thereof, includes the accommodation portion 17a formed in a form of a bag for accommodating therein the seat members 32, 33 and the coil springs 34, 35, 36. The side plate 17 receives and supports a centrifugal force of the coil springs 34, 35, 36 and the seat members 32, 33, and a component force acting in the radial direction in a case where the coil is compressed. The accommodation portion 17a is configured to be in contact with and out of contact from the seat members 32, 33 at end surfaces of the accommodation portion 17a in the circumferential direction, respectively. In a case where a torsion is not generated between the side plate 17, 18 and the center plate 23, the accommodation portion 17a is in contact with the seat members 32, 33 or the accommodation portion 17a is positioned close to the seat members 32, 33 while allowing play between the accommodation portion 17a and the seat members 32, 33. In a case where the torsion is generated between the side plate 17, 18 and the center plate 23, the accommodation portion 17a is in contact with one of the seat member 32 and the seat member 33. The side plate 17 includes the recessed portion 17d formed at a surface, which faces in a direction of the drive plate 10, of the side plate 17, in a manner that the recessed portion 17d is arranged between the adjacent accommodation portions 17a, 17a in the circumferential direction. The recessed portion 17d is a portion at which the block member 14 is attached. The recessed portion 17d may be formed by means of cutting or press-molding. The block member 14, which is attached to the recessed portion 17d, is fixed to the side plate 17 at the welded portion 15. The side plate 17 is formed so as to cover a radially outer side of the outer coil spring 34. The side plate 17, at an outer peripheral surface thereof, is inserted inside the ring gear 21 shaped in an annular shape and the ring gear 21 is fixed to the side plate 17 at the welded portion 22. An end portion of the side plate 17, which faces in a direction of the torque converter 4, is in close contact with the side plate 18 along the entire circumference of the side plate 17, and the side plate 17 is fixed to the side plate 18 at the welded portion 19.

The side plate 18 is an annular member (refer to FIGS. 1 to 4). The side plate 18 is arranged at a torque converter side. The side plate 18 is arranged radially outwardly relative to the block member 30 formed in an annular shape, while leaving a predetermined distance between the side plate 18 and the block member 30. A radially outward portion of the side plate 18 is in close contact with the side plate 17 along an entire circumference of the side plate 18, and the side plate 18 is fixed to the side plate 17 at the welded portion 19. Accordingly, the side plate 18 rotates integrally with the side plate 17, and lubricant in the inside of the space in which the coil springs 34, 35, 36 are accommodated does not leak out from a joint portion between the side plate 17 and the side plate 18. The side plate 18 includes at an intermediate portion thereof an accommodation portion 18a formed in a form of a bag for accommodating therein the seat members 32, 33 and the coil springs 34, 35, 36. The accommodation portion 18a is configured to be in contact with and out of contact from the seat members 32, 33 at end surfaces in the circumferential direction, respectively. In a case where a torsion is not generated between the side plate 17, 18 and the center plate 23, the accommodation portion 18a is in contact with the seat members 32, 33 or the accommodation portion 18a is positioned close to the seat members 32, 33 while allowing play between the accommodation portion 18a and the seat members 32, 33. In a case where the torsion is generated between the side plate 17, 18 and the center plate 23, the accommodation portion 18a is in contact with one of the seat member 32 and the seat member 33. The side plate 18 includes a drawn portion provided at a radially inward portion thereof relative to the accommodation portion 18a for projecting in a direction of the center plate 23 along the entire circumference of the side plate 18. The side plate 18 is, at the drawn portion thereof, in slidably pressure contact with the cover member 25 along the entire circumference. At a clearance between the side plate 18 and the center plate 23, the portion in which the coil springs 34, 35, 36 are accommodated is covered with the cover member 25.

The welded portion 19 is a portion at which the side plate 17 and the side plate 18 are fixedly welded with each other (refer to FIGS. 1 and 4).

Figure 3:
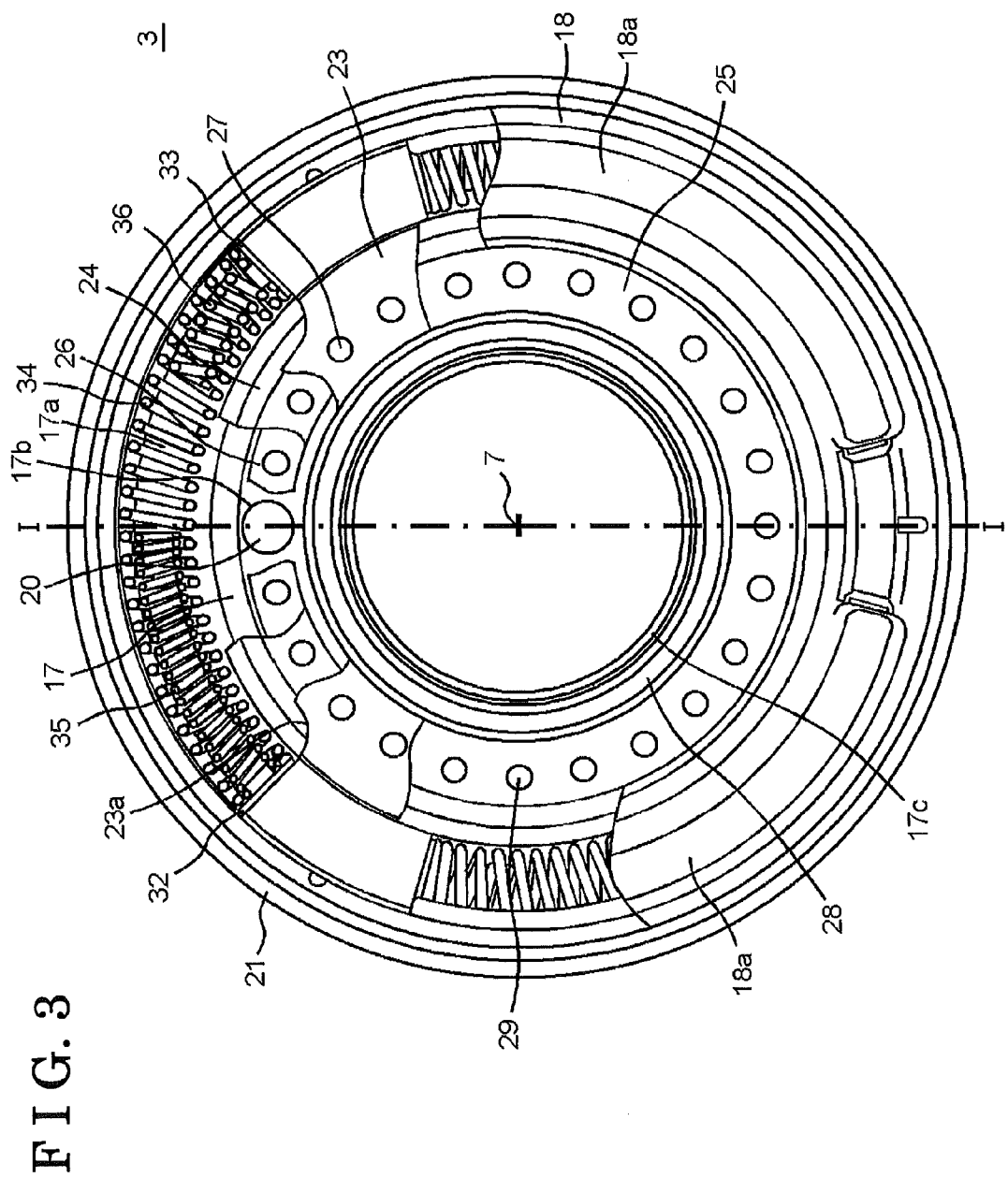
FIG. 3 is a partly broken-away plan view seen from a direction of an arrow B in FIG. 1, which schematically illustrates the torque fluctuation absorber according to the first embodiment.

The cap 20 is a member closing the entire hole portion 17b of the side plate 17 and is mounted on the hole portion 17b (refer to FIGS. 1 and 3).

The ring gear 21 is a ring-shaped gear including a gear portion formed at an outer peripheral surface thereof (refer to FIGS. 1 to 4). The ring gear 21 engages with an output gear of a starter motor. The ring gear 21 is attached to an outer peripheral portion of the side plate 17 and is fixed to the side plate 17 at the welded portion 22.

The welded portion 22 is a portion at which the ring gear 21 is fixed to the side plate 17 by means of welding (refer to FIGS. 1, 2 and 4).

The center plate 23 is an annular member (refer to FIGS. 1, 3 and 4). The center plate 23 is arranged at an outer periphery of the cylindrical portion 17c of the side plate 17. The center plate 23 is, at an inner peripheral end portion thereof, rotatably supported at the cylindrical portion 17c of the side plate 17 via the bearing 28. The center plate 23 is arranged radially inwardly relative to the joint portion between the side plate 17 and the side plate 18, while leaving a predetermined distance between the joint portion and the center plate 23. The cover members 24, which are respectively arranged at both sides of the center plate 23 in the direction of the rotational axis 7, and the side member 26 are fixed to a radially inward portion of the center plate 23 by means of the rivet 27 at plural positions. Accordingly, the center plate 23 rotates integrally with the cover members 24, 25. The center plate 23 is fastened to (engaged with) the block member 30 together with the cover members 24, 25 and the side member 26 by means of the bolt 29. Accordingly, the center plate 23 rotates integrally with the front cover 40 of the torque converter 4 via the block member 30. The center plate 23 includes, at an outer peripheral portion thereof, a window portion 23a defined by a cut-out portion for accommodating therein the seat members 32, 33 and the coil springs 34, 35, 36. The window portion 23a is configured to be in contact with and out of contact from the seat members 32, 33 at end surfaces of the window portion 23a in the circumferential direction, respectively. In a case where the torsion is not generated between the side plate 17, 18 and the center plate 23, the window portion 23a is in contact with the seat members 32, 33. In a case where the torsion is generated between the side plate 17, 18 and the center plate 23, the window portion 23a is in contact with one of the seat member 32 and the seat member 33.

The cover member 24 is an annular plate member (refer to FIGS. 1, 3 and 4). The cover member 24 is, at a radially inward portion thereof, sandwiched between the center plate 23 and the side member 26. The cover member 24 is fixedly riveted to the center plate 23 together with the cover member 25 and the side member 26 by means of the rivet 27, and is fastened to (engaged with) the block member 30 together with the center plate 23, the cover member 25 and the side member 26 by means of the bolt 29. At a radially outward portion of the cover member 24, the cover member 24 is positioned away from the center plate 23, and is in slidably pressure contact with the drawn portion of the side plate 17. Accordingly, the portion in which the coil springs 34, 35, 36 are accommodated is covered from the clearance between the side plate 17 and the center plate 23.

The cover member 25 is an annular plate member (refer to FIGS. 1, 3 and 4). The cover member 25 is, at a radially inward portion thereof, sandwiched between the center plate 23 and the block member 30. The cover member 25 is fixedly riveted to the center plate 23 together with the cover member 24 and the side member 26 by means of the rivet 27, and is fastened to (engaged with) the block member 30 together with the center plate 23, the cover member 24 and the side member 26 by means of the bolt 29. At a radially outward portion of the cover member 25, the cover member 25 is positioned away from the center plate 23, and is in slidably pressure contact with the drawn portion of the side plate 18. Accordingly, the portion in which the coil springs 34, 35, 36 are accommodated is covered from the clearance between the side plate 18 and the center plate 23.

The side member 26 is an annular plate member (refer to FIGS. 1 to 4). The side member 26 is for pressing the radially inward portion of the cover member 24 against the center plate 23 and for securing the radially inward portion of the cover member 24 at the center plate 23 by means of the rivet 27. The side member 26 is fixedly riveted to the center plate 23 together with the cover members 24, 25 by means of the rivet 27, and is fastened to (engaged with) the block member 30 together with the center plate 23 and the cover members 24, 25 by means of the bolt 29.

The rivet 27 is a member fixedly riveting the cover members 24, 25 and the side member 26 to the center plate 23 (refer to FIGS. 1, 3 and 4).

The bearing 28 allows the center plate 23 to be rotatable relative to the side plate 17 (refer to FIGS. 1, 3 and 4). The inner ring of the bearing 28 is fixed to the outer peripheral surface of the cylindrical portion 17c of the side plate 17 and an outer ring of the bearing 28 is fixed to the inner peripheral end portion of the center plate 23. The bearing 28 is a sealed-type and grease is enclosed therein. A seal plate which is made of steel and to which synthetic rubber is adhered is fixed to the outer ring of the bearing 28, and a lip portion of an edge portion of the seal plate is slidably in contact with the inner ring of the bearing 28, and thus the grease is tightly sealed.

The bolt 29 is a member fastening (engaging) the center plate 23, the cover members 24, 25 and the side member 26 to the block member 30 (refer to FIGS. 1, 3 and 4).

The block member 30 is a block-shaped annular member to which the center plate 23 is fastened (engaged) by means of the bolt 29 (refer to FIGS. 1 and 4). The block member 30 is, at a radially outward portion thereof and at a radially inward portion thereof, fixedly welded to the front cover 40 of the torque converter 4 at the welded portions 31, 31. The block member 30 includes a female screw portion which is provided at a portion corresponding to the bolt 29 and into which the bolt 29 is screwed. The center plate 23, the cover members 24, 25 and the side member 26 are fastened to (engaged with) to the block member 30 by means of the bolt 29, and thus the block member 30 rotates integrally with the center plate 23 and the front cover 40.

The welded portion 31 is a portion at which the block member 30 is fixed to the front cover 40 of the torque converter 4 by means of welding (refer to FIGS. 1 and 4). At the welded portions 31, 31, a radially outward portion and a radially inward portion of the block member 30 are fixed to the front cover 40.

The seat member 32 is a member which is accommodated in the accommodation portions 17a, 18a of the side plates 17, 18 and in the window portion 23a of the center plate 23. The seat member 32 is arranged between a first end surface of the accommodation portions 17a, 18a and of the window portion 23a, and a first end portion of the outer coil spring 34 in the circumferential direction (refer to FIG. 3). In order to reduce abrasion of the outer coil spring 34, the seat member 32 may be made of resin. The seat member 32 includes a portion press-fitted in an inside of a first end portion of the inner coil spring 35 arranged inside the outer coil spring 34 so that the first end portion of the inner coil spring 35 is secured by means of press-fitting.

The seat member 33 is a member which is accommodated in the accommodation portions 17a, 18a of the side plates 17, 18 and in the window portion 23a of the center plate 23. The seat member 33 is arranged between a second end surface of the accommodation portions 17a, 18a and of the window portion 23a, and a second end portion of the outer coil spring 34 in the circumferential direction (refer to FIG. 3). In order to reduce the abrasion of the outer coil spring 34, the seat member 33 may be made of resin. The seat member 33 includes a portion press-fitted in an inside of a second end portion of the inner coil spring 36 arranged inside the outer coil spring 34 so that the second end portion of the inner coil spring 36 is secured by means of press-fitting.

The outer coil spring 34 is accommodated in the accommodation portions 17a, 18a of the side plates 17, 18 and in the window portion 23a of the center plate 23, and is in contact with the seat members 32, 33 arranged respectively at end portions of the outer coil spring 34 (refer to FIGS. 1 and 3).

The outer coil spring 34 is compressed in a case where the torsion is generated between the side plate 17, 18 and the center plate 23. At the inside of the outer coil spring 34, the inner coil spring 35 is arranged in a vicinity of the seat member 32 in the circumferential direction, and the inner coil spring 36 is arranged in a vicinity of the seat member 33 in the circumferential direction. In a case where the torsion is generated between the side plate 17, 18 and the center plate 23, the outer coil spring 34 is compressed to a substantially minimum length thereof before the inner coil spring 35 and the inner coil spring 36 come in close contact with each other. In a case where the torsion is generated between the side plate 17, 18 and the center plate 23, and when the outer coil spring 34 is compressed to the substantially minimum length thereof, the outer coil spring 34 serves as a stopper restricting the torsion between the side plate 17, 18 and the center plate 23. The outer coil spring 34 is set to have a spring constant that is smaller than those of the inner coil springs 35, 36. In a case where the torsion is generated between the side plate 17, 18 and the center plate 23, the outer coil spring 34 is compressed to the substantially minimum length thereof after the inner coil spring 35 is compressed to the substantially minimum length thereof.

The inner coil spring 35 is arranged at the inside of the outer coil spring 34 to be positioned in a vicinity of the seat member 32 in the circumferential direction (refer to FIGS. 1 and 3). The first end portion of the inner coil spring 35 is fixed to the seat member 32 in a manner that a portion of the seat member 32 is press-fitted in an inside of the first end portion of the inner coil spring 35, and thus the inner coil spring 35 is secured to the seat member 32. In a case where the torsion is not generated between the side plate 17, 18 and the center plate 23, a second end portion of the inner coil spring 35 is positioned away from a first end portion of the inner coil spring 36. In a case where the torsion is generated between the side plate 17, 18 and the center plate 23, and a torsional angle reaches a predetermined torsional angle, the second end portion of the inner coil spring 35 is in contact with the first end portion of the inner coil spring 36. In a case where the torsion is further generated relative to the predetermined torsional angle, the inner coil spring 35 is compressed. The spring constant of the inner coil spring 35 is set to be greater than that of the outer coil spring 34, and to be smaller than that of the inner coil spring 36. In a case where the torsion is generated between the side plate 17, 18 and the center plate 23, the inner coil spring 35 is compressed to the substantially minimum length thereof before the outer coil spring 34 is compressed to the substantially minimum length thereof.

The inner coil spring 36 is arranged at the inside of the outer coil spring 34 to be positioned in a vicinity of the seat member 33 in the circumferential direction (refer to FIG. 3). The second end portion of the inner coil spring 36 is fixed to the seat member 33 in a manner that a portion of the seat member 33 is press-fitted in an inside of the second end portion of the inner coil spring 36, and thus the inner coil spring 36 is secured to the seat member 33. In a case where the torsion is not generated between the side plate 17, 18 and the center plate 23, the first end portion of the inner coil spring 36 is positioned away from the second end portion of the inner coil spring 35. In a case where the torsion is generated between the side plate 17, 18 and the center plate 23, and the torsional angle reaches the predetermined torsional angle, the first end portion of the inner coil spring 36 is in contact with the second end portion of the inner coil spring 35. In a case where the torsion is generated further than the predetermined torsional angle, the inner coil spring 36 is compressed. The spring constant of the inner coil spring 36 is set to be greater than those of the outer coil spring 34 and the inner coil spring 35. In a case where the torsion is generated between the side plate 17, 18 and the center plate 23, the inner coil spring 36 is not compressed to the substantially minimum length thereof until the outer coil spring 34 is compressed to the substantially minimum length thereof.

The torque converter 4 is a hydraulic power transmission for generating amplification of the torque due to a rotational difference between a pump impeller 42 (for example, plural pump impellers 42), which is an input side, and a turbine runner 46 (for example, plural turbine runners 46), which is an output side, by using a dynamic effect of fluid in a fluid working chamber (refer to FIG. 1). The torque converter 4 is arranged on a power transmission path between the torque fluctuation absorber 3 and the input shaft 6. The torque converter 4 includes a lock-up clutch 5 of a single-disc type. In a case where a difference in the number of rotations between the pump impeller 42 and the turbine runner 46 is small, the lock-up clutch 5 allows the pump impeller 42 and the turbine runner 46 to be directly connected with each other, and eliminates a difference in the number of rotations between the crankshaft 2 and the input shaft 6. The torque converter 4 includes, as component parts, the front cover 40, a pump shell 41, the pump impeller 42, a shaft 43, a pump core 44, a turbine shell 45, the turbine runner 46, a turbine core 47, a turbine hub 48, a stator 49, a one-way clutch 50, a shaft 51, a plate member 52, a lock-up piston 53 and a friction material 54.

The front cover 40 is a disc-shaped member arranged at an engine side (that is, on the right side in FIG. 1) relative to the torque converter 4 (refer to FIG. 1). The front cover 40 is formed to extend from the rotational axis 7 radially outwardly, and an outer peripheral portion of the front cover 40 extends in a direction of the transmission (that is, the left side in FIG. 1). An outer peripheral end portion of the front cover 40 is fixed to an outer peripheral end portion of the pump shell 41 by means of welding. The front cover 40 rotates integrally with the pump shell 41. In a space surrounded by the front cover 40 and the pump shell 41, component parts of the torque converter 4, including, for example, the pump impeller 42 and the turbine runner 46 are arranged, and automatic transmission fluid (ATF) serving as a working fluid is enclosed. The rotative power from the engine is inputted to the front cover 40 via the crankshaft 2 and the torque fluctuation absorber 3. The block member 30 of the torque fluctuation absorber 3 is welded to a surface, which faces in a direction of the engine (that is, on the right side in FIG. 1), of the front cover 40 at the welded portion 31. The front cover 40, at a surface thereof which faces in a direction of the transmission (that is, on the left side in FIG. 1), is frictionally engageable with the friction material 54 of the lock-up clutch 5.

The pump shell 41 is an annular member defining the space in which the ATF circulates (refer to FIG. 1). The outer peripheral end portion of the pump shell 41 is welded to the outer peripheral end portion of the front cover 40 and an inner peripheral end portion of the pump shell 41 is welded to the shaft 43. The pump shell 41 rotates integrally with the front cover 40 and the shaft 43. The plural pump impellers 42 are attached to a surface (an inner surface), which faces in a direction of the engine (that is, on the right side in FIG. 1), of the pump shell 41, and thus the pump shell 41 rotates integrally with the plural pump impellers 42.

The pump impeller 42 is a blade member of a pump side (refer to FIG. 1). Each pump impeller 42 is arranged so as to face the turbine runner 46. Relative to a center of the torque converter 4 in an axial direction thereof, an outer side end portion of the pump impeller 42 is attached to the pump shell 41 and an inner side end portion of the pump impeller 42 is attached to the pump core 44. The pump impeller 42 rotates integrally with the pump shell 41 and the pump core 44. The pump impeller 42 includes a configuration where the pump impeller 42 pushes the ATF, which flows from the stator 49, toward a direction of the turbine runner 46 in a case where the pump shell 41 rotates in one direction.

The shaft 43 is a shaft member formed in a hollow-cylindrical shape (refer to FIG. 1) and is rotatably supported at a case that covers the torque converter 4 and an outer periphery and/or a portion, which is in a vicinity of the transmission, of the torque fluctuation absorber 3. The shaft 43 is welded to the inner peripheral end portion of the pump shell 41, and thus rotates integrally with the pump shell 41. The shaft 43 is arranged at an outer periphery of the shaft 51 leaving a predetermined distance therebetween.

The pump core 44 is an annular member to which the inner side end portion of each of the plural pump impellers 42 is attached (refer to FIG. 1).

The turbine shell 45 is an annular member defining the space in which the ATF circulates (refer to FIG. 1). The turbine shell 45 is, at an inner peripheral portion thereof, fixed to the turbine hub 48 by means of plural rivets. The turbine shell 45 rotates integrally with the turbine hub 48. The plural turbine runners 46 are attached to a surface (an inner surface), which faces in a direction of the transmission (that is, on the left side in FIG. 1), of the turbine shell 45, and the turbine shell 45 rotates integrally with the plural turbine runners 46. The plate member 52 is fixed to the turbine shell 45 at a surface (an outer surface), which faces in a direction of the engine (that is, on the right side in FIG. 1), of the turbine shell 45 by means of welding.

The turbine runner 46 is a blade member of a turbine side (refer to FIG. 1). The turbine runner 46 is arranged so as to face the pump impeller 42. Relative to the center of the torque converter 4 in the axial direction thereof, an outer side end portion of the turbine runner 46 is attached to the turbine shell 45 and an inner side end portion of the turbine runner 46 is attached to the turbine core 47. The turbine runner 46 rotates integrally with the turbine shell 45 and the turbine core 47. The turbine runner 46 includes a configuration where the turbine runner 46 receives the ATF, which is pushed out by the pump impeller 42 as the pump impeller 42 rotates, and the turbine runner 46 discharges the ATF toward the stator 49. The turbine runner 46 is rotatable relative to the pump impeller 42 independent from the pump impeller 42.

The turbine core 47 is an annular member to which the inner side end portion of each of the plural turbine runners 46 is attached (refer to FIG. 1).

The turbine hub 48 is a member including a flange portion extending radially outwardly from a hub portion formed in a hollow-cylindrical shape (refer to FIG. 1). The turbine shell 45 is fixed to an outer peripheral portion of the flange portion of the turbine hub 48 by means of the plural rivets. The turbine hub 48 is, at an inner side of the hub portion thereof, splined to and engages with the input shaft 6 of the transmission so as to be movable in the axial direction but so as not to be rotatable. The turbine hub 48 rotates integrally with the turbine shell 45 and the input shaft 6. A cylinder portion of an inner peripheral portion of the lock-up piston 53 is arranged at an outer peripheral surface of the hub portion of the turbine hub 48 in a slidable manner in the axial direction. A sliding surface between the turbine hub 48 and the lock-up piston 53 is sealed.

The stator 49 is a member including plural blades for rectifying flow of the ATF flowing from the turbine runner 46 back to the pump impeller 42 (refer to FIG. 1). The stator 49 is arranged between the pump impeller 42 and the turbine runner 46 to be positioned closer to radially inward portion. The stator 49 acts so that a direction of the flow of the ATF from the turbine runner 46 back to the pump impeller 42 is changed. The stator 49 is attached to the case of the transmission via the one-way clutch 50 and the shaft 51, and is rotatable in one direction.

The one-way clutch 50 is a clutch rotatable in one direction (refer to FIG. 1). As the one-way clutch 50, a structure employing, for example, a roller mechanism, a sprag mechanism or a ratchet mechanism may be used. The one-way clutch 50 is arranged between the shaft 43 and the turbine hub 48 in the axial direction, and is arranged between the stator 49 and the shaft 51 in the radial direction. An outer ring of the one-way clutch 50 is fixed to the stator 49, and an inner ring of the one-way clutch 50 is splined to and engages with the shaft 51 so as to be movable in the axial direction but so as not to be rotatable.

The shaft 51 is a shaft member formed in a hollow-cylindrical shape and is attached to the case of the transmission so as not to be rotatable (refer to FIG. 1). The shaft 51 is splined to and engages with the inner ring of the one-way clutch 50 so as to be movable in the axial direction but so as not to be rotatable. The shaft 51 is arranged at an inner side of the shaft 43 formed in the hollow-cylindrical shape while leaving a predetermined distance between the shaft 51 and the shaft 43. The shaft 51 is arranged at an outer periphery of the input shaft 6 of the transmission and rotatably supports the input shaft 6 via a bush.

The plate member 52 is an annular member fixed at an outer surface of the turbine shell 45 by means of welding (refer to FIG. 1). The plate member 52 is splined to and engaged with the lock-up piston 53 so as to be movable in the axial direction but not so as to be rotatable. The plate member 52 rotates integrally with the turbine shell 45 and the lock-up piston 53.

The lock-up piston 53 is a piston formed in an annular shape for directly connecting the pump impeller 42 and the turbine runner 46 to each other in a case where the difference in the number of rotations between the pump impeller 42 and the turbine runner 46 is small (refer to FIG. 1). The lock-up piston 53 is arranged between an oil chamber 56 and an oil chamber 57 which are defined in a space surrounded by the front cover 40 and the pump shell 41. The oil chamber 56 is arranged between the lock-up piston 53 and the front cover 40, and the oil chamber 57 is arranged between the lock-up piston 53 and the pump shell 41. The friction material 54 formed in an annular shape is fixed to a surface, which faces in a direction of the front cover 40, of the lock-up piston 53 at a radially outward portion of the lock-up piston 53, and the lock-up piston 53 rotates integrally with the friction material 54. In a case where the friction material 54 frictionally engages with the front cover 40, the lock-up piston 53 rotates integrally with the crankshaft 2 via the friction material 54, the front cover 40, and the torque fluctuation absorber 3. The lock-up piston 53 is, at an outer peripheral end portion thereof, splined to and engages with the plate member 52 so as to be movable in the axial direction but so as not to be rotatable. The lock-up piston 53 rotates integrally with the input shaft 6 of the transmission via the plate member 52, the turbine shell 45 and the turbine hub 48. The lock-up piston 53 is arranged so as to be slidable in the axial direction relative to the outer peripheral surface of the hollow cylindrical-shaped hub portion of the turbine hub 48, and is sealed at a sliding surface between the lock-up piston 53 and the turbine hub 48. The lock-up piston 53 is pushed in a direction of the front cover 40 in a case where a hydraulic pressure in the oil chamber 56 is lower than a hydraulic pressure in the oil chamber 57, and thus the friction material 54 and the front cover 40 frictionally engage with each other. The lock-up piston 53 moves to be away from the front cover 40 in a case where the hydraulic pressure in the oil chamber 56 is higher than the hydraulic pressure in the oil chamber 57, and thus the frictional engagement between the friction material 54 and the front cover 40 is released. The hydraulic pressure in each of the oil chambers 56, 57 is controlled by a hydraulic circuit, so that a lock-up condition (that is, a state where there is no difference in the number of rotations between the crankshaft 2 and the input shaft 6) is established by controlling the hydraulic pressure in the oil chamber 56 to be lower than that in the oil chamber 57, and the lock-up condition is released by controlling the hydraulic pressure in the oil chamber 56 to be higher than that in the oil chamber 57.

The friction material 54 is an annular member fixed to the lock-up piston 53 (alternatively, the friction material 54 may be fixed to the front cover 40) and is frictionally engageable with the front cover 40 (refer to FIG. 1).

According to the first embodiment, at the torque fluctuation absorber 3, the members at the engine side relative to the coil springs 34, 35, 36 on the power transmission path correspond to the side plate 17, 18. In addition, the block member 14 which the drive plate 10 is connected to (engaged with) is attached to the side plate 17 at the portion between the adjacent accommodation portions 17a, 17a in the circumferential direction of the side plate 17. Accordingly, the torsional angle at the damper portion of the torque fluctuation absorber 3 is increased, and inertia at the engine side relative to the coil springs 34, 35, 36 on the power transmission path is increased.

According to the first embodiment, the inertia is set to be large at the engine side on the power transmission path relative to the coil springs 34, 35, 36. Thus, rotational fluctuation of the engine is restricted, which enhances an attenuation performance.

According to the first embodiment, the block member 14 is attached to a portion of the side plate 17 which is positioned between the adjacent accommodation portions 17a, 17a in the circumferential direction of the side plate 17 and which is recessed in the axial direction. Thus, the torsional angle at the damper portion of the torque fluctuation absorber 3 is increased, and a space, in which the torque fluctuation absorber 3 is arranged, in the axial direction is reduced.

According to the first embodiment, the recessed portion 17d is provided at the side plate 17, between the adjacent accommodation portions 17a, 17a in the circumferential direction of the side plate 17, at the portion recessed in the axial direction of the side plate 17, and the block member 14 is attached to the recessed portion 17d. This allows a position-setting of the block member 14 to be conducted, and allows a portion at which the bolt 16 is screwed into to be long. Thus, a secure fastening (engagement) is provided. Thus, a secure fastening (engagement) is provided.

According to the first embodiment, the block member 14 is welded to the side plate 17, and thus a weakest portion of the side plate 17 is reinforced and deformation of the side plate 17 is restricted. Accordingly, strength of the side plate 17 is increased.

According to the first embodiment, torque transmitted from the drive plate 10 is transmitted directly to the coil springs 34, 35, 36 via the block member 14, that is, a transmission path of the torque is not offset in the radial direction. Thus, a shear force caused by the torque transmission does not act on the side plate 17, and therefore rigidity of the side plate 17 may be set low. Accordingly, the torque fluctuation absorber 3 may be downsized in the axial direction and weight thereof is reduced by reducing a thickness of the side plate 17.

According to the first embodiment, the block member 14 is arranged further radially outwardly so that a position at which the bolt 16 is fastened is away from the rotational axis 7. Thus, a shear strength of the bolt 16 and an axial force, which may generate a frictional force, of the bolt 16 may be set low. Accordingly, the number of the bolt 16 is reduced and/or a bolt of a lower strength category may be used as the bolt 16, which may result in weight saving and/or cost reduction.

According to the first embodiment, in the circumferential direction, the block member 14 includes a portion that partly overlaps with the coil springs 34, 35, 36 in the axial direction. Thus, the torsional angle at the damper portion is increased, and the space of the torque fluctuation absorber 3 in the axial direction is reduced.

Figure 5:
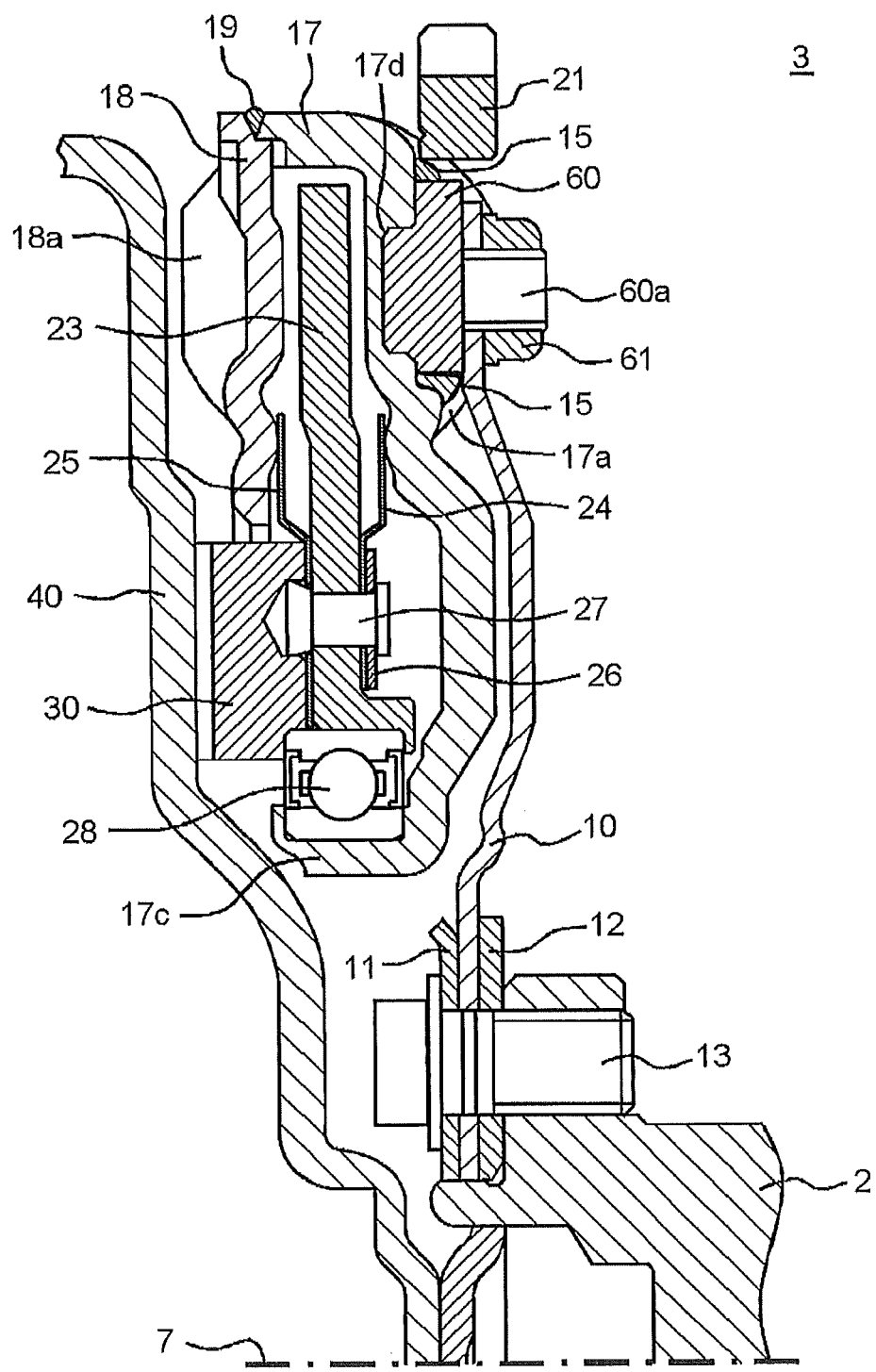
FIG. 5 is a partial enlarged cross-sectional view schematically illustrating a torque fluctuation absorber according to a second embodiment.

The torque fluctuation absorber 3 according to a second embodiment will be explained with reference to the drawings. As illustrated in FIG. 5, in the second embodiment, which is a modification of the first embodiment, the female threaded portion (corresponding to the female threaded portion 14a in FIG. 2) is not provided at a block member 60. In the second embodiment, a male threaded portion 60a protruding in the direction of the engine in the axial direction (that is, on the right side in FIG. 5) is provided at the block member 60, the male threaded portion 60a is brought to be inserted in a hole portion provided at the drive plate 10, and a nut 61 serving as the engaging member is screwed onto the male threaded portion 60a. Thus, the drive plate 10 is fastened to (engaged with) the block member 60. The block member 60 is a block-shaped member which the drive plate 10 is fastened to (engaged with) by means of the nut 61. The block member 60 is attached to the recessed portion 17d formed at the side plate 17, at the portion between the accommodation portion 17a (that is, the portion in which the coil springs 34, 35, 36 are accommodated) and another accommodation portion 17a positioned next or adjacent thereto in the circumferential direction of the side plate 17. In other words, the block member 60 is arranged at a position that overlaps with the position of the accommodation portion 17a in the circumferential direction. The block member 60 is, at the radially inward and the outward portions thereof, fixedly welded to the side plate 17 at the welded portions 15, 15, respectively. The block member 60 rotates integrally with the drive plate 10 and the side plate 17. Other structures of the second embodiment are identical to those of the first embodiment.

According to the second embodiment, advantages likewise the first embodiment are attained. In addition, the male threaded portion 60a is inserted in the hole portion of the drive plate 10 during assembly, and thus a position-setting of the side plate 17 and the drive plate 10 relative to each other in the circumferential direction is easily conducted, thereby enhancing assemblability.

Figure 6:
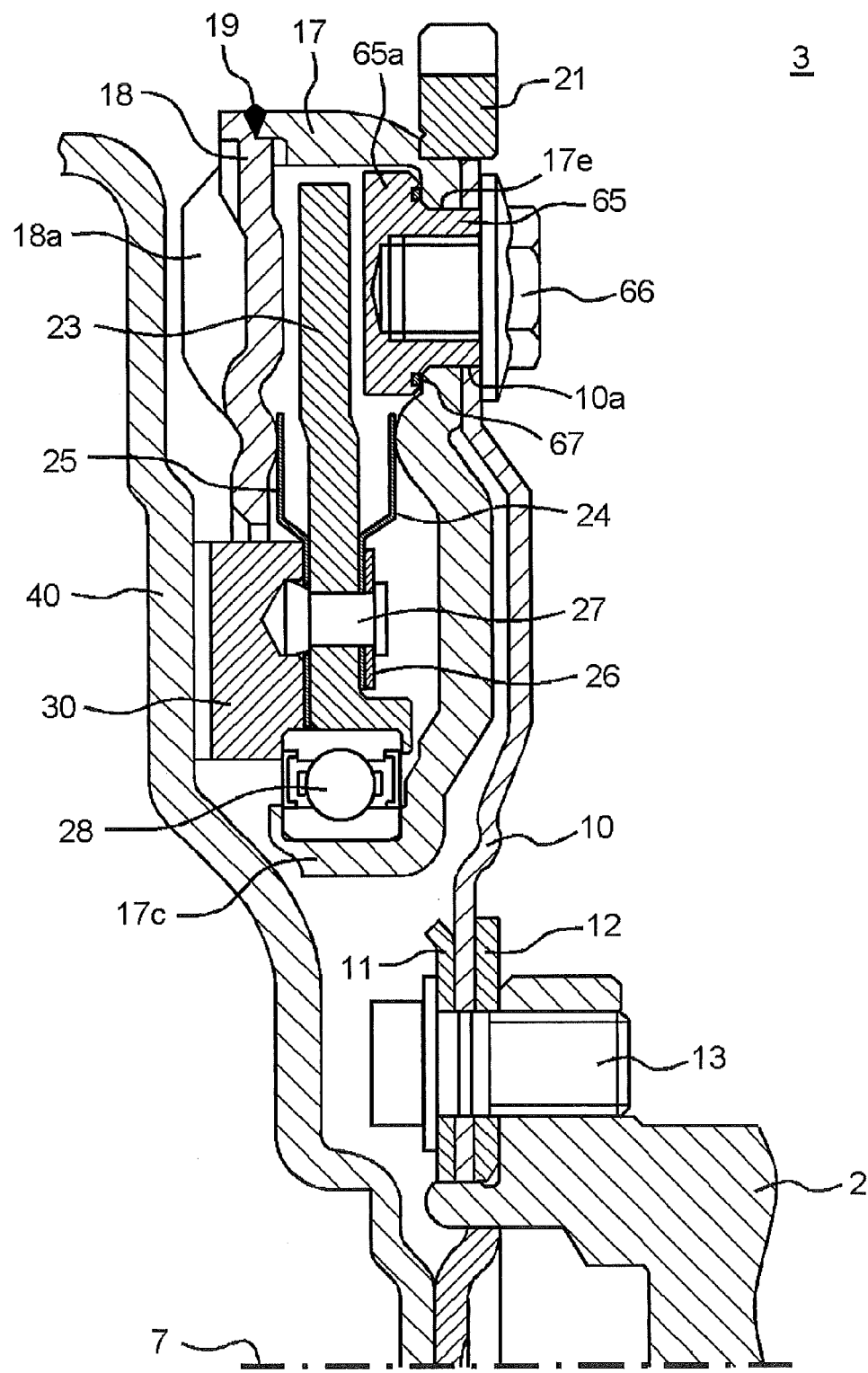
FIG. 6 is a partial enlarged cross-sectional view schematically illustrating a torque fluctuation absorber according to a third embodiment.

The torque fluctuation absorber 3 according to a third embodiment will be explained with reference to the drawings. As illustrated in FIG. 6, in the third embodiment, which is a modification of the first embodiment, the recessed portion (corresponding to the recessed portion 17d) is not provided at the side plate 17, at the portion between the accommodation portion (corresponding to the accommodation portion 17a in FIG. 4) and another accommodation portion 17a positioned next or adjacent thereto in the circumferential direction of the side plate 17. In the third embodiment, the first window portion 17e is provided at the side plate 17 and a second window portion 10a is provided at the drive plate 10. The block member 65 is inserted (alternatively, press-fitted) in the first window portion 17e and in the second window portion 10a from an inner side of the side plate 17 (that is, from a surface of the side plate 17 which faces the center plate 23 toward another surface of the side plate 17 which faces the drive plate 10 in the axial direction), so that the drive plate 10 and the side plate 17 are fastened to (engaged with) the block member 65 by means of a bolt 66 serving as the engaging member. The block member 65 is a block-shaped member which the drive plate 10 and the side plate 17 are fastened to (engaged with) by means of the bolt 66. The block member 65 is fitted by insertion in the first window portion 17e provided at the portion of the side plate 17 between the adjacent accommodation portions 17a, 17a in the circumferential direction and in the second window portion 10a provided at the drive plate 10 by being inserted from the inner side of the side plate 17. The block member 65 includes, at the inner side of the side plate 17, a flange portion 65a which is engaged with and is in contact with a peripheral edge portion of the first window portion 17e at an inner surface of the side plate 17. The block member 65 receives the elastic force of the coil springs 34, 35, 36 at the flange portion 65a (serving as a portion of the block member 65 which is arranged at the inner side of the side plate 17). The block member 65 is provided with a seal 67 (including, for example, an O-ring and a liquid seal) arranged at a surface at which the block member 65 is in contact with the side plate 17. A contact surface between the block member 65 and the side plate 17 is sealed by means of the seal 67. The block member 65 is arranged at the position that overlaps with the position of the accommodation portion (corresponding to the accommodation portion 17a in FIG. 4) in the circumferential direction. End surfaces of the block member 65 (that is, end surfaces of the flange portion 65a) in the circumferential direction are configured to be in contact with and out of contact from the seat members (corresponding to the seat members 32, 33 in FIG. 3). The block member 65 rotates integrally with the drive plate 10 and the side plate 17. Other structures of the third embodiment are identical to those of the first embodiment. In addition to the fastening (engaging) by means of the block member 65 and the bolt 66, the block member 65 may also be fastened (engaged) by means of a male threaded portion formed at the block member and a nut screwed onto the male threaded portion.

According to the third embodiment, the advantages likewise the first embodiment are attained. In addition, there is no need to weld the block member 65 to the side plate 17. Accordingly, deformation of the side plate 17 due to welding distortion is reduced, and thus assembly accuracy enhances and imbalance during rotation may be reduced. The block member 65 may be welded to the side plate 17.

According to the third embodiment, the seat members 32, 33 are in direct contact with the end surfaces of the block member 65, and therefore the torsional angle of the coil springs 34, 35, 36, that is, the torsional angle at the damper portion, may be set to be large by a thickness of the recessed portion 17d of the side plate 17. Accordingly, the flexibility in or the degree of freedom of the rigidity-setting may increase. Further, there is no need to interpose the side plate 17 between the seat members 32, 33 and the block member 65, and therefore the seat members 32, 33 are in direct contact with the end surfaces of the block member 65, and there is no need to consider weldability. Accordingly, the block member 65 may be made of material including a high abrasion-resistance and/or a high shock absorption so that durability and/or quietness enhances.

According to the third embodiment, the block member 65 is fitted in the second window portion 10a of the drive plate 10 by insertion, the torque from the drive plate 10 is transmitted to the side plate 17 via the block member 65, but not the bolt 66. Accordingly, a load acting on the bolt 66 is reduced, and thus the number of the bolt and/or the strength of the bolt may be reduced.

Within a range of the whole disclosure (including a scope of the claims, and the drawings) and on the basis of the basic technical ideas thereof, the aforementioned embodiments may be changed and/or adjusted. In addition, within a range of the scope of the claims, various combinations and/or selections of each element disclosed is possible. That is, this disclosure includes various changes and modifications that one skilled in the art will achieve in accordance with the whole disclosure including the scope of the claims and the drawings, and the technical idea.

According to the embodiments, the torque fluctuation absorber 3 includes the drive plate 10 configured to rotate integrally with the crankshaft 2 of the engine, the center plate 23 arranged coaxially with and rotatable relative to the drive plate 10, the side plate 17, 18 arranged coaxially with and rotatably relative to the center plate 23, the outer coil spring 34 and the inner coil spring 35 for absorbing the torque fluctuations generated between the side plate 17, 18 and the center plate 23, and the block member 14, 60, 65 configured to be engaged with the drive plate 10 by means of the bolt 16, 66 or the nut 61 and attached to the side plate 17, wherein the side plate 17, 18 includes the plural accommodation portions 17a, 18a accommodating the coil springs 34, 35, and at least one of the recessed portion 17d and the first window portion 17e which are provided at the position corresponding to the position of the block member 14, 60, 65, and the block member 14, 60, 65 is attached to the portion of the side plate 17 between the adjacent accommodation portions 17a, 17a in the circumferential direction of the side plate 17.

According to the above-described structure, at the torque fluctuation absorber 3, the members at the engine side relative to the coil springs 34, 35 on the power transmission path correspond to the side plate 17, 18. In addition, the block member 14, 60, 65 at which the drive plate 10 is configured to be engaged is attached to the side plate 17 at the portion between the adjacent accommodation portions 17a, 17a in the circumferential direction of the side plate 17. Accordingly, the torsional angle at the torque fluctuation absorber 3 is increased, and the inertia at the engine side relative to the coil springs 34, 35 on the power transmission path is set to be large. Because the inertia is set to be large at the engine side relative to the coil springs 34, 35 on the power transmission path, the rotational fluctuation of the engine is restricted, which increases the attenuation performance.

According to the embodiments, the portion of the side plate 17 between the adjacent accommodation portions 17a, 17a in the circumferential direction of the side plate 17 is recessed in the axial direction of the side plate 17 relative to the accommodation portions 17a.

According to the embodiments, the side plate 17 includes the recessed portion 17d at the position corresponding to the position of the block member 14, 60 and the block member 14, 60 is attached to the recessed portion 17d.

According to the embodiments, the recessed portion 17d is formed by means of cutting or pressing.

According to the embodiments, the block member 14, 60 is welded to the side plate 17.

According to the embodiments, the side plate 17 includes the first window portion 17e at the position corresponding to the position of the block member 65 and the block member 65 is attached to the side plate 17 by being inserted or press-fitted in the first window portion 17e of the side plate 17 from the inner side of the side plate 17.

According to the embodiments, the drive plate 10 includes the second window portion 10a at a position corresponding to the position of the block member 65 and the block member 65 is inserted or press-fitted in the second window portion 10a of the drive plate 10 from the inner side of the side plate 17.

According to the embodiments, the torque fluctuation absorber 3 further includes the seal 67 interposed between the block member 65 and the side plate 17 which are in contact with each other.

According to the embodiments, the block member 65 receives the elastic force of the coil springs 34, 35 at the flange portion 65a of the block member 65 which is arranged at the inner side of the side plate 17.

According to the embodiments, the block member 14 includes the female threaded portion 14a, and the bolt 16 is an engaging member 16 penetrating the drive plate 10 and screwed into the female threaded portion 14a.

According to the embodiments, the block member 60 includes the male threaded portion 60a penetrating the drive plate 10, and the nut 61 is the engaging member 61 screwed onto the male threaded portion 60a.

According to the embodiments, the center plate 23 is configured to rotate integrally with the front cover 40 of the torque converter 4.

According to the embodiments, the block member 14, 60, 65 includes the portion overlapping with the coil springs 34, 35 in the circumferential direction of the side plate 17.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
a drive plate configured to rotate integrally with a crankshaft of an internal combustion engine;
a center plate arranged coaxially with and rotatably relative to the drive plate;
a side plate arranged coaxially with and rotatably relative to the center plate;
an elastic member for absorbing torque fluctuations generated between the side plate and the center plate; and
a block member configured to be engaged with the drive plate by an engaging member and attached to the side plate, wherein
the side plate includes a plurality of accommodation portions accommodating the elastic member, and at least one of a recessed portion and a first window portion which are provided at a position corresponding to a position of the block member;
the block member is attached to a portion of the side plate between adjacent accommodation portions in a circumferential direction of the side plate; and
the block member includes a portion overlapping with the elastic member in the circumferential direction of the side plate.

2. The torque fluctuation absorber according to claim 1, wherein the portion of the side plate between the adjacent accommodation portions in the circumferential direction of the side plate is recessed in an axial direction of the side plate relative to the accommodation portions.

3. The torque fluctuation absorber according to claim 1, wherein the side plate includes the recessed portion at the position corresponding to the position of the block member and the block member is attached to the recessed portion.

4. The torque fluctuation absorber according to claim 3, wherein the recessed portion is formed by means of cutting or pressing.

5. The torque fluctuation absorber according to claim 1, wherein the block member is welded to the side plate.

6. The torque fluctuation absorber according to claim 1, wherein the side plate includes the first window portion at the position corresponding to the position of the block member and
the block member is attached to the side plate by being inserted or press-fitted in the first window portion of the side plate from an inner side of the side plate.

7. The torque fluctuation absorber according to claim 6, wherein the drive plate includes a second window portion at a position corresponding to the position of the block member and
the block member is inserted or press-fitted in the second window portion of the drive plate from the inner side of the side plate.

8. The torque fluctuation absorber according to claim 6, further comprising:
a seal interposed between the block member and the side plate which are in contact with each other.

9. The torque fluctuation absorber according to claim 6, wherein the block member receives an elastic force of the elastic member at a portion of the block member which is arranged at the inner side of the side plate.

10. The torque fluctuation absorber according to claim 1, wherein the block member includes a female threaded portion, and the engaging member is a bolt penetrating the drive plate and screwed into the female threaded portion.

11. The torque fluctuation absorber according to claim 1, wherein the block member includes a male threaded portion penetrating the drive plate, and the engaging member is a nut screwed onto the male threaded portion.

12. The torque fluctuation absorber according to claim 1, wherein the center plate is configured to rotate integrally with a front cover of a torque converter.

13. The torque fluctuation absorber according to claim 1, wherein the block member includes a convex portion which is positioned in the recessed portion and a contact portion which is arranged outwardly relative to the convex portion and contacts to the side plate in an axial direction.

* * * * *